(12) United States Patent
Lim et al.

(10) Patent No.: US 9,608,290 B2
(45) Date of Patent: Mar. 28, 2017

(54) ELECTROLYTE SOLUTION ADDITIVE FOR LITHIUM SECONDARY BATTERY, AND NON-AQUEOUS ELECTROLYTE SOLUTION AND LITHIUM SECONDARY BATTERY INCLUDING THE ADDITIVE

(71) Applicant: LG Chem, Ltd., Seoul (KR)

(72) Inventors: Young Min Lim, Daejeon (KR); Chul Haeng Lee, Daejeon (KR); Doo Kyung Yang, Daejeon (KR); Yu Ha An, Daejeon (KR)

(73) Assignee: LG Chem, Ltd. (KR)

( * ) Notice: Subject to any disclaimer, the term of this patent is extended or adjusted under 35 U.S.C. 154(b) by 366 days.

(21) Appl. No.: 14/290,093

(22) Filed: May 29, 2014

(65) Prior Publication Data

US 2014/0272604 A1    Sep. 18, 2014

Related U.S. Application Data

(63) Continuation of application No. PCT/KR2014/001386, filed on Feb. 20, 2014.

(30) Foreign Application Priority Data

Feb. 20, 2013 (KR) .................. 10-2013-0017989
Feb. 20, 2014 (KR) .................. 10-2014-0019557

(51) Int. Cl.
| | | |
|---|---|---|
| H01M 10/0567 | (2010.01) | |
| H01M 10/0568 | (2010.01) | |
| H01M 6/16 | (2006.01) | |
| H01M 10/052 | (2010.01) | |
| H01M 10/0569 | (2010.01) | |
| H01M 10/42 | (2006.01) | |
| H01M 10/0525 | (2010.01) | |

(52) U.S. Cl.
CPC ....... *H01M 10/0567* (2013.01); *H01M 6/164* (2013.01); *H01M 6/166* (2013.01); *H01M 6/168* (2013.01); *H01M 10/052* (2013.01); *H01M 10/0525* (2013.01); *H01M 10/0568* (2013.01); *H01M 10/0569* (2013.01); *H01M 10/4235* (2013.01); *Y02E 60/122* (2013.01)

(58) Field of Classification Search
CPC ......... H01M 10/0567; H01M 10/0568; H01M 10/0569; H01M 10/052; H01M 6/168; H01M 6/166; H01M 6/164; Y02E 60/122
See application file for complete search history.

(56) References Cited

U.S. PATENT DOCUMENTS

| | | |
|---|---|---|
| 2003/0118914 A1 | 6/2003 | Mori |
| 2004/0106047 A1 | 6/2004 | Mie et al. |
| 2006/0240322 A1 | 10/2006 | Xu et al. |
| 2009/0017386 A1 | 1/2009 | Xu et al. |
| 2009/0169992 A1 | 7/2009 | Ishiko et al. |
| 2009/0286155 A1 | 11/2009 | Takehara |
| 2010/0323240 A1 | 12/2010 | Tsujioka et al. |
| 2011/0039163 A1 | 2/2011 | Deguchi et al. |
| 2011/0168956 A1 | 7/2011 | Muthu et al. |
| 2012/0009487 A1 | 1/2012 | Hwang et al. |
| 2012/0164519 A1 | 6/2012 | Lee et al. |
| 2012/0219866 A1 | 8/2012 | Onuki et al. |
| 2012/0244425 A1 | 9/2012 | Tokuda |
| 2012/0258357 A1 | 10/2012 | Kim |
| 2012/0316716 A1 | 12/2012 | Odani et al. |
| 2013/0052543 A1 | 2/2013 | Ihara et al. |
| 2014/0030610 A1 | 1/2014 | Abe et al. |
| 2015/0155555 A1 | 6/2015 | Yamamoto et al. |

FOREIGN PATENT DOCUMENTS

| | | |
|---|---|---|
| CN | 102027624 A | 4/2011 |
| EP | 2485316 A1 | 8/2012 |
| JP | 2004-165151 A | 6/2004 |
| JP | 2009187698 A | 8/2009 |
| JP | 2010282761 A | 12/2010 |
| JP | 2011049153 A | 3/2011 |
| JP | 2011071098 A | 4/2011 |
| JP | 2011096643 A | 5/2011 |
| KR | 20080004459 A | 1/2008 |
| KR | 2009-0039211 A | 4/2009 |
| KR | 20090118117 A | 11/2009 |
| KR | 20100040843 A | 4/2010 |
| KR | 20120083290 A | 7/2012 |
| KR | 2012-0090755 A | 8/2012 |
| KR | 20120090969 A | 8/2012 |

(Continued)

OTHER PUBLICATIONS

Search report from European Application No. 14732059.2, dated Jan. 19, 2015.
International Search Report for Application No. PCT/KR2014/001386 dated May 26, 2014.
International Search Report for Application No. PCT/KR2014/001387 dated Jun. 3, 2014.
Search Report from European Appliation No. 14732495.8, dated Jan. 22, 2015.
Zhang et al., "A review on electrolyte additives for lithium-ion batteries," Journal of Power Sources, Elsevier SA, CH, vol. 162, No. 2, Nov. 22, 2006, pp. 1379-1394.

(Continued)

*Primary Examiner* — Laura Weiner
(74) *Attorney, Agent, or Firm* — Lerner, David, Littenberg, Krumholz & Mentlik, LLP

(57) ABSTRACT

Provided is an electrolyte solution additive including lithium difluorophosphate (LiDFP), a vinylene carbonate-based compound, and a sultone-based compound. Also, a non-aqueous electrolyte solution including the electrolyte solution additive and a lithium secondary battery including the non-aqueous electrolyte solution are provided. The lithium secondary battery including the electrolyte solution additive of the present invention may improve low-temperature output characteristics, high-temperature cycle characteristics, output characteristics after high-temperature storage, and swelling characteristics.

9 Claims, 8 Drawing Sheets

(56) References Cited

FOREIGN PATENT DOCUMENTS

| KR | 2012-0115839 A | 10/2012 |
|---|---|---|
| WO | 2009/131419 A2 | 10/2009 |
| WO | 2011/070964 A1 | 6/2011 |
| WO | 2012/141270 A1 | 10/2012 |
| WO | 2014021014 A1 | 2/2014 |
| WO | 2014/104710 A1 | 7/2014 |

OTHER PUBLICATIONS

Office Action from corresponding European Application No. 14732059.2, dated Oct. 26, 2015.
The Committee of Battery Technology, the Electrochemical Society of Japan, Battery Handbook, OHM Electric Co., Ltd., Feb. 10, 2010, Edition 1, Issue 3, pp. 533-546.

_US 9,608,290 B2_

ELECTROLYTE SOLUTION ADDITIVE FOR LITHIUM SECONDARY BATTERY, AND NON-AQUEOUS ELECTROLYTE SOLUTION AND LITHIUM SECONDARY BATTERY INCLUDING THE ADDITIVE

CROSS-REFERENCE TO RELATED APPLICATION

This application is a continuation of International Application No. PCT/KR2014/001386 filed on Feb. 20, 2014, which claims priority to Korean Patent Application No. 10-2013-0017989 filed on Feb. 20, 2013 and Korean Patent Application No. 10-2014-0019557 filed on Feb. 20, 2014, the disclosures of which are incorporated herein by reference.

TECHNICAL FIELD

The present invention relates to an electrolyte solution additive for a lithium secondary battery including a plurality of compounds, a non-aqueous electrolyte solution including the electrolyte solution additive, and a lithium secondary battery including the non-aqueous electrolyte solution.

BACKGROUND ART

Demand for secondary batteries as an energy source has been significantly increased as technology development and demand with respect to mobile devices have increased. Among these secondary batteries, lithium secondary batteries having high energy density and high voltage have been commercialized and widely used.

A lithium metal oxide is used as a cathode active material of a lithium secondary battery, and lithium metal, a lithium alloy, crystalline or amorphous carbon, or a carbon composite is used as an anode active material. A current collector may be coated with the active material of appropriate thickness and length or the active material itself may be coated in the form of a film, and the resultant product is then wound or stacked with an insulating separator to prepare an electrode group. Thereafter, the electrode group is put into a can or a container similar thereto, and a secondary battery is then prepared by injecting an electrolyte solution.

Charge and discharge of the lithium secondary battery is performed while a process of intercalating and deintercalating lithium ions from a lithium metal oxide cathode into and out of a graphite anode is repeated. In this case, since lithium is highly reactive, lithium reacts with the carbon electrode to form $Li_2CO_3$, LiO, or LiOH. Thus, a film may be formed on the surface of the anode. The film is denoted as "solid electrolyte interface (SEI)", wherein the SEI formed at an initial stage of charging may prevent a reaction of the lithium ions with the carbon anode or other materials during the charge and discharge. Also, the SEI may only pass the lithium ions by acting as an ion tunnel. The ion tunnel may prevent the destruction of a structure of the carbon anode due to the co-intercalation of the carbon anode and organic solvents of an electrolyte solution having a high molecular weight which solvates lithium ions and moves therewith.

Therefore, in order to improve high-temperature cycle characteristics and low-temperature output of the lithium secondary battery, a robust SEI must be formed on the anode of the lithium secondary battery. When the SEI is once formed during the first charge, the SEI may prevent the reaction of the lithium ions with the anode or other materials during repeated charge and discharge cycles caused by the subsequent use of the battery, and may act as an ion tunnel that only passes the lithium ions between the electrolyte solution and the anode.

Typically, with respect to an electrolyte solution which does not include an electrolyte solution additive or includes an electrolyte solution additive having poor characteristics, the improvement of low-temperature output characteristics may not be expected due to the formation of non-uniform SEI. In addition, even in the case in which the electrolyte solution additive is included, the surface of the cathode may be decomposed during a high-temperature reaction or the electrolyte solution may generate an oxidation reaction due to the electrolyte solution additive when the input thereof is not adjusted to a required amount. Thus, irreversible capacity of the secondary battery may be eventually increased and output characteristics may be decreased.

DISCLOSURE OF THE INVENTION

Technical Problem

The present invention is provided to solve technical problems of the related art.

The inventors of the present application recognized that low-temperature output characteristics may not only be improved but high-temperature cycle characteristics, output characteristics after high-temperature storage, and swelling characteristics may also be improved in a case where an electrolyte solution for a lithium secondary battery includes a plurality of specific additives, thereby leading to completion of the present invention.

Technical Solution

According to an aspect of the present invention, there is provided an electrolyte solution additive including lithium difluorophosphate (LiDFP), a vinylene carbonate-based compound, and a sultone-based compound.

According to another aspect of the present invention, there is provided a non-aqueous electrolyte solution including: an electrolyte solution additive including lithium difluorophosphate (LiDFP), a vinylene carbonate-based compound, and a sultone-based compound; a non-aqueous organic solvent; and a lithium salt.

According to another aspect of the present invention, there is provided a lithium secondary battery including a cathode, an anode, and the non-aqueous electrolyte solution.

Advantageous Effects

According to an electrolyte solution additive for a lithium secondary battery of the present invention, since a robust solid electrolyte interface (SEI) may be formed on an anode during the initial charge of the lithium secondary battery including the additive, the electrolyte solution additive may not only improve low-temperature output characteristics but may also improve output characteristics after high-temperature storage and swelling characteristics by inhibiting the decomposition of the surface of a cathode that may occur during a high-temperature cycle and preventing an oxidation reaction of an electrolyte solution.

MODE FOR CARRYING OUT THE INVENTION

Figure 1:
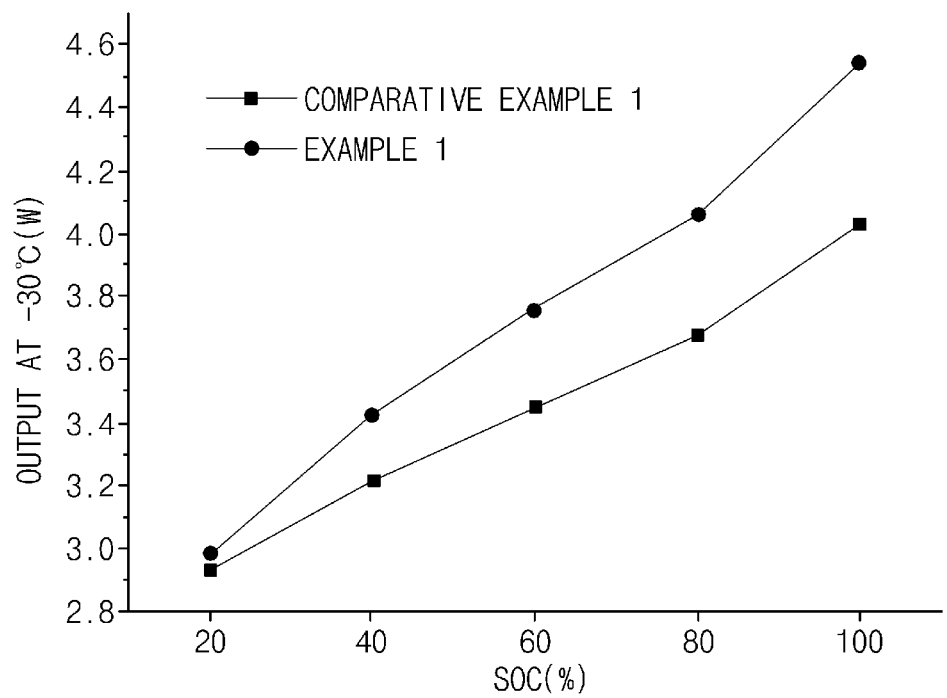
FIG. 1 is a graph illustrating the results of the measurement of low-temperature output characteristics of lithium secondary batteries including a non-aqueous electrolyte of the present invention, according to Experimental Example 1.

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An electrolyte solution additive according to an embodiment of the present invention may include a combination of lithium difluorophosphate (LiDFP), a vinylene carbonate-based compound, and a sultone-based compound.

Since the lithium difluorophosphate is added to a non-aqueous electrolyte solution to form a robust SEI on an anode, the lithium difluorophosphate may improve low-temperature output characteristics. Also, the lithium difluorophosphate may inhibit the decomposition of the surface of a cathode, which may occur during a high-temperature cycle, and may prevent an oxidation reaction of an electrolyte solution.

Herein, the lithium difluorophosphate may be included in an amount of 0.05 wt % to 5 wt %, for example, 0.05 wt % to 1 wt % based on a total weight of the electrolyte solution. In the case that the amount of the lithium difluorophosphate is less than 0.05 wt %, effects of improving the low-temperature output and high-temperature cycle characteristics of the battery may be insignificant. In the case in which the amount of the lithium difluorophosphate is greater than 5 wt %, side reactions in the electrolyte solution may excessively occur during charge and discharge of the battery. In particular, when the lithium difluorophosphate is excessively added, the lithium difluorophosphate may not be sufficiently decomposed, and thus, the lithium difluorophosphate may be included as an unreacted material or precipitates in the electrolyte solution at room temperature. Accordingly, side reactions decreasing the lifetime or resistance characteristics of the secondary battery may occur.

The electrolyte solution additive according to the embodiment of the present invention may include a vinylene carbonate-based compound. The vinylene carbonate-based compound, together with lithium difluorophosphate, may form a SEI by being added to the electrolyte solution.

A type of the vinylene carbonate-based compound is not particularly limited as long as it may achieve the above objectives. For example, the vinylene carbonate-based compound may include vinylene carbonate, vinylene ethylene carbonate, or a combination thereof. Among these materials, vinylene carbonate may be particularly used.

In this case, an amount of the vinylene carbonate-based compound is not particularly limited as long as it is an amount required for attaining the effects of the present invention, such as the improvement of low-temperature output and high-temperature cycle characteristics, and for example, may be in a range of 0.1 wt % to 5 wt % based on the total weight of the electrolyte solution. In the case that the amount of the vinylene carbonate-based compound is less than 0.1 wt %, an effect of forming an SEI, which is expected according to the addition, may not be sufficiently obtained. In the case in which the amount of the vinylene carbonate-based compound is greater than 5 wt %, the enhancement effect is limited, but resistance may be increased by increasing irreversible capacity or forming an excessively thick SEI. Also, some of the vinylene carbonate-based compound that remains after forming the SEI may be used for compensating the SEI. However, when the amount thereof is excessively large, side reactions may occur between the vinylene carbonate-based compound and a cathode active material.

In a case where the vinylene carbonate-based compound is added as a typical electrolyte solution additive, there were limitations in that the decomposition of the electrolyte solution may be promoted at a high temperature and a swelling phenomenon may be more severe. However, in the present invention, such limitations may be resolved by adding a predetermined amount of the lithium difluorophosphate to the electrolyte solution. The electrolyte solution additive according to the embodiment of the present invention may include a sultone-based compound. The sultone-based compound may include a sultone group.

The sultone-based compound, for example, may be any one selected from the group consisting of 1,3-propane sultone, 1,4-butane sultone, and 1,3-propene sultone, or a mixture of two or more thereof. Among these materials, 1,3-propane sultone may be particularly used. In this case, an amount of the sultone-based compound is not particularly limited as long as it is an amount required for attaining the effects of the present invention, such as the improvement of low-temperature output and high-temperature cycle characteristics, and for example, may be in a range of 0.01 wt % to 5 wt % based on the total weight of the electrolyte solution.

It may be effective that the vinylene carbonate-based compound and the sultone-based compound are included in the electrolyte solution at a specific ratio. That is, the vinylene carbonate-based compound and the sultone-based compound may be included in the electrolyte solution in a weight ratio of 1:1 to 6:1. In a case where the weight ratio of the vinylene carbonate-based compound to the sultone-based compound is 6 or more, lifetime performance may be reduced due to side reactions, such as the promotion of the decomposition of the electrolyte solution at a high temperature and the increase in the swelling phenomenon.

Also, since a non-aqueous electrolyte solution according to an embodiment of the present invention includes the vinylene carbonate-based compound and the sultone-based compound in a weight ratio of 1:1 to 6:1, the non-aqueous electrolyte solution may efficiently increase the effect of the lithium difluorophosphate on the improvement of high-temperature cycle characteristics and low-temperature output.

The non-aqueous electrolyte solution according to the embodiment of the present invention may include the electrolyte solution additive, a non-aqueous organic solvent, and a lithium salt.

When the amount of the electrolyte solution additive added to the non-aqueous electrolyte solution is excessively small, the electrolyte solution additive may be entirely consumed during the initial operation of the lithium secondary battery, and thus, the lifetime may decrease during charge and discharge or long-term storage. When the amount of the electrolyte solution additive is excessively large, a side reaction of the remaining additive may adversely affect capacity and stability characteristics of the battery. In consideration of such phenomena, a total amount of the electrolyte solution additive, for example, may be in a range of 1 wt % to 10 wt % based on the total weight of the electrolyte solution.

Any one selected from the group consisting of $LiPF_6$, $LiAsF_6$, $LiCF_3SO_3$, $LiN(CF_3SO_2)_2$, $LiBF_4$, $LiBF_6$, $LiSbF_6$, $LiN(C_2F_5SO_2)_2$, $LiAlO_4$, $LiAlCl_4$, $LiSO_3CF_3$ and $LiClO_4$, or a mixture of two or more thereof may be used as the lithium salt that may be included in the non-aqueous electrolyte solution according to the embodiment of the present invention.

Also, the non-aqueous organic solvent, which may be included in the non-aqueous electrolyte solution, is not limited as long as it may minimize the decomposition due to the oxidation reaction during the charge and discharge of the battery and may exhibit desired characteristics with the additive. For example, the non-aqueous organic solvent may include cyclic carbonate, linear carbonate, ester, ether, or ketone. These materials may be used alone or in a combination of two or more thereof.

Among the above non-aqueous organic solvents, carbonate-based organic solvents may be particularly used. Examples of the cyclic carbonate may be any one selected from the group consisting of ethylene carbonate (EC), propylene carbonate (PC), and butylene carbonate (BC), or a mixture of two or more thereof. Examples of the linear carbonate may be any one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

A lithium secondary battery according to an embodiment of the present invention may include a cathode, an anode, a separator disposed between the cathode and the anode, and the non-aqueous electrolyte solution. The cathode and the anode may include a cathode active material and an anode active material, respectively.

Herein, the cathode active material may include a manganese-based spinel active material, lithium metal oxide, or a mixture thereof. Furthermore, the lithium metal oxide may be selected from the group consisting of lithium-cobalt-based oxide, lithium-manganese-based oxide, lithium-nickel-manganese-based oxide, lithium-manganese-cobalt-based oxide, and lithium-nickel-manganese-cobalt-based oxide, and for example, may include $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (where $0\leq Y<1$), $Li(Ni_aCo_bMn_c)O_4$ (where $0<a<2$, $0<b<2$, $0<c<2$, and $a+b+c=2$), $LiMn_{2-z}Ni_zO_4$, and $LiMn_{2-z}Co_zO_4$ (where $0<z<2$).

As the anode active material, a carbon-based anode active material, such as crystalline carbon, amorphous carbon, or a carbon composite, may be used alone or in a mixture of two or more thereof.

Also, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination of two or more thereof as the separator. In addition, a typical porous nonwoven fabric, for example, a nonwoven fabric formed of high melting point glass fibers or polyethylene terephthalate fibers may be used. However, the separator is not limited thereto.

EXAMPLES

Hereinafter, the present invention will be described in more detail, according to examples and experimental examples. However, the present invention is not limited thereto.

Example 1

Preparation of Electrolyte Solution

A non-aqueous electrolyte solution was prepared by adding 0.2 wt % of lithium difluorophosphate, 3 wt % of vinylene carbonate (VC), and 0.5 wt % of 1,3-propane sultone (PS) based on a total weight of the electrolyte solution to a mixture solvent including a non-aqueous organic solvent having a composition, in which a volume ratio of ethylene carbonate (EC):ethylmethyl carbonate (EMC):dimethyl carbonate (DMC) was 3:3:4, and 1.0 M $LiPF_6$.

[Preparation of Lithium Secondary Battery]

A cathode mixture slurry was prepared by adding 92 wt % of a mixture of $LiMn_2O_4$ and $Li(Ni_{0.33}Co_{0.33}Mn_{0.33})O_2$ as a cathode active material, 4 wt % of carbon black as a conductive agent, and 4 wt % of polyvinylidene fluoride (PVdF) as a binder to N-methyl-2-pyrrolidone (NMP) as a solvent. An about 20 μm thick aluminum (Al) thin film as a cathode current collector was coated with the cathode mixture slurry and dried, and the Al thin film was then roll-pressed to prepare a cathode.

Also, an anode mixture slurry was prepared by adding 96 wt % of carbon powder as an anode active material, 3 wt % of PVdF as a binder, and 1 wt % of carbon black as a conductive agent to NMP as a solvent. A 10 μm thick copper (Cu) thin film as an anode current collector was coated with the anode mixture slurry and dried, and the Cu thin film was then roll-pressed to prepare an anode.

A polymer type battery was prepared by a typical method using a separator formed of three layers of polypropylene/polyethylene/polypropylene (PP/PE/PP) with the cathode and anode thus prepared, and a lithium secondary battery was then completed by injecting the prepared non-aqueous electrolyte solution.

Example 2

A non-aqueous electrolyte solution and a lithium secondary battery were prepared in the same manner as in Example 1 except that an electrolyte solution additive, in which 1 wt % of lithium difluorophosphate was added, was used as an additive.

Example 3

A non-aqueous electrolyte solution and a lithium secondary battery were prepared in the same manner as in Example 2 except that an electrolyte solution additive, in which 2.9 wt % of VC and 0.5 wt % of 1,3-propane sultone were added, was used as an additive. Herein, a weight ratio of the VC to the PS was 5.8:1.

Comparative Example 1

A non-aqueous electrolyte solution and a lithium secondary battery were prepared in the same manner as in Example 1 except that an electrolyte solution additive, which did not include lithium difluorophosphate, was used as an additive.

Comparative Example 2

A non-aqueous electrolyte solution and a lithium secondary battery were prepared in the same manner as in Example 1 except that an electrolyte solution additive, which did not include VC and PS, was used as an additive.

Comparative Example 3

A non-aqueous electrolyte solution and a lithium secondary battery were prepared in the same manner as in Example 1 except that an electrolyte solution additive, in which 1.2 wt % of lithium difluorophosphate was added, was used as an additive.

Comparative Example 4

A non-aqueous electrolyte solution and a lithium secondary battery were prepared in the same manner as in Example 2 except that an electrolyte solution additive, in which 3.1 wt % of VC and 0.5 wt % of PS were added, was used as an additive. Herein, a weight ratio of the VC to the PS was 6.2:1.

Experimental Example 1

Low-Temperature Output Characteristics Test of Lithium Secondary Battery

Low-temperature outputs were calculated from voltage differences which were obtained by discharging the lithium secondary batteries of Example 1 and Comparative Example 1 at 0.5 C for 10 seconds for the state of charge (SOC) at −30° C. The results thereof are presented in FIG. 1.

Referring to FIG. 1, in a case where the SOC was 100%, it may be understood that the lithium secondary battery of Example 1 had low-temperature output characteristics that were improved about 1.2 times in comparison to that of the lithium secondary battery of Comparative Example 1. Similarly, in a case where the SOC was 20%, 40%, 60%, and 80%, the same results as those of the case in which the SOC was 100% may be obtained.

Eventually, it may be confirmed that the electrolyte solution additive including lithium difluorophosphate had an effect of improving the low-temperature output characteristics of the lithium secondary battery in comparison to other electrolyte solution additives.

Experimental Example 2

High-Temperature Cycle Characteristics Test of Lithium Secondary Battery

The lithium secondary batteries of Example 1 and Comparative Examples 1 and 2 were charged at 1 C to 4.2 V/38 mA at 55° C. under a constant current/constant voltage (CC/CV) condition and then discharged at a constant current (CC) of 3 C to a voltage of 3.03 V to measure discharge capacities. The charge and discharge were repeated 1 to 1,000 cycles and the measured discharge capacities are presented in FIG. 2.

Figure 2:
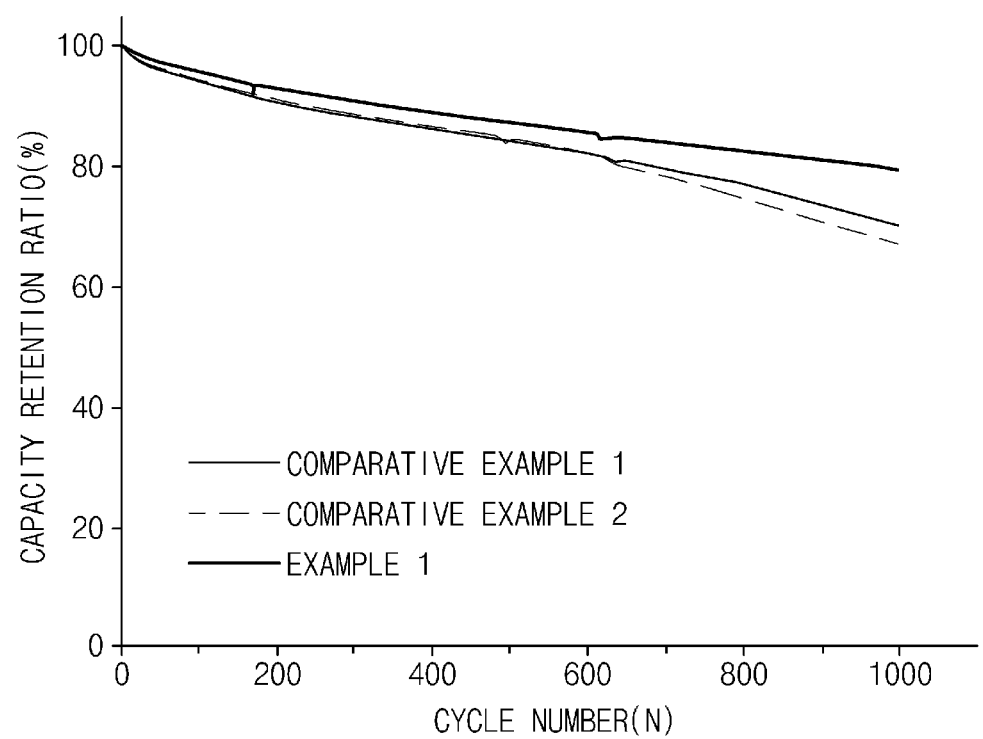
FIG. 2 is a graph illustrating the results of the measurement of high-temperature (55° C.) cycle characteristics of lithium secondary batteries including a non-aqueous electrolyte of the present invention, according to Experimental Example 2.

Referring to FIG. 2, with respect to high-temperature cycle characteristics, the lithium secondary battery of Example 1 initially exhibited a capacity retention ratio similar to those of Comparative Examples 1 and 2 to a $100^{th}$ cycle. After about a $200^{th}$ cycle, the capacity retention ratio of the lithium secondary battery of Example 1 was not changed even in the case in which the number of cycles was increased. However, with respect to Comparative Examples 1 and 2, the capacity retention ratios were gradually decreased after about a $400^{th}$ cycle and a significant difference in the capacity retention ratio from Example 1 was obtained in a $700^{th}$ cycle.

Thus, it may be confirmed that the capacity retention ratio was better when lithium difluorophosphate, VC and PS were used in combination.

Experimental Example 3

Output Characteristics After High-Temperature Storage of Lithium Secondary Battery The lithium secondary batteries of Example 1 and Comparative Example 1 were stored at 60° C., and outputs were then calculated from voltage differences which were obtained by discharging the lithium secondary batteries at 5 C for 10 seconds at 50% SOC. The results thereof are presented in FIG. 3.

Figure 3:
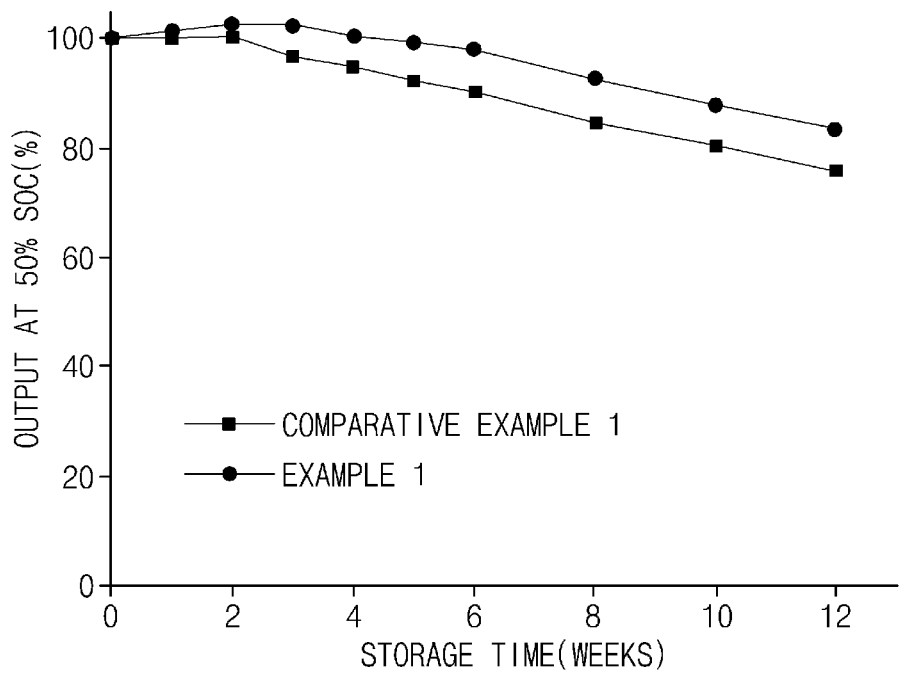
FIG. 3 is a graph illustrating the results of the measurement of output characteristics after high-temperature storage of lithium secondary batteries including a non-aqueous electrolyte of the present invention, according to Experimental Example 3.

Referring to FIG. 3, it may be understood that high-temperature output of the lithium secondary battery of Example 1 including lithium difluorophosphate as an electrolyte solution additive was better than high-temperature output of the lithium secondary battery of Comparative Example 1 regardless of storage time. In particular, it may be understood that a difference between high-temperature output characteristics were further increased after a storage time of 3 weeks.

Experimental Example 4

Swelling Characteristics Test After High-Temperature Storage of Lithium Secondary Battery The lithium secondary batteries of Example 1 and Comparative Example 1 were stored at 60° C. and thicknesses of the batteries were then measured after storing the batteries at 95% SOC. The results thereof are presented in FIG. 4.

Figure 4:
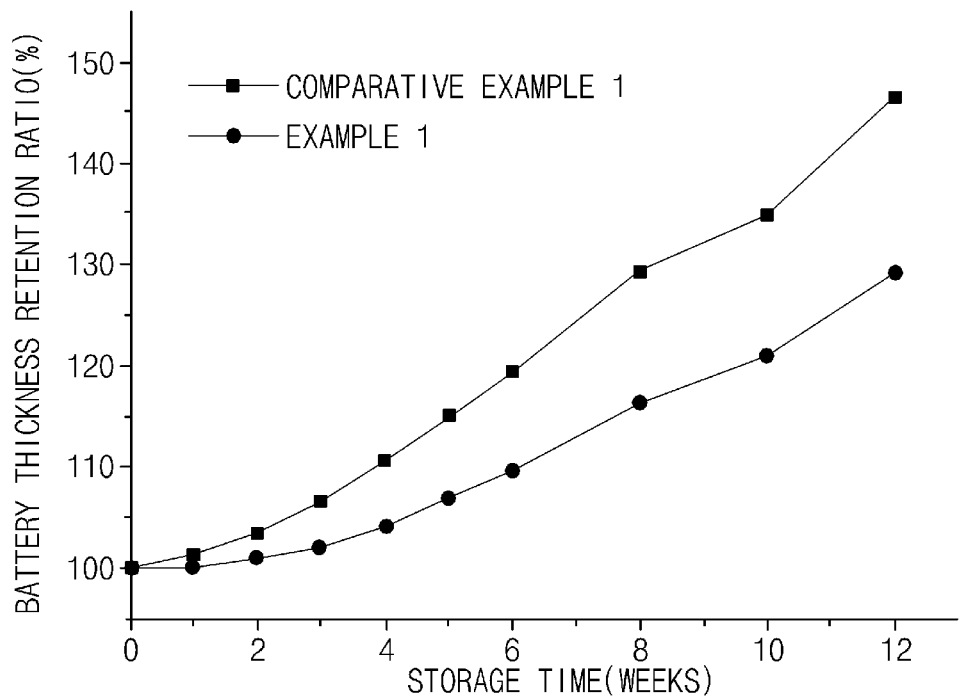
FIG. 4 is a graph illustrating the results of the measurement of swelling characteristics after high-temperature storage of lithium secondary batteries including a non-aqueous electrolyte of the present invention, according to Experimental Example 4.

Referring to FIG. 4, the thickness of the lithium secondary battery of Comparative Example 1, which did not include lithium difluorophosphate, was significantly increased after a storage time of 2 weeks. In contrast, a thickness retention ratio of the lithium secondary battery of Example 1 including lithium difluorophosphate was low in comparison to Comparative Example 1, and was about 1.5 times that of Comparative Example 1 after a storage time of 12 weeks.

Thus, it may be understood that the lithium secondary battery of Example 1 including lithium difluorophosphate had a better effect of preventing the swelling of the battery after high-temperature storage than the lithium secondary battery of Comparative Example 1.

Experimental Example 5

Low-Temperature Output Characteristics Test of Lithium Secondary Battery

Low-temperature outputs were calculated from voltage differences which were obtained by discharging the lithium secondary batteries of Example 2 and Comparative Example 3 at 0.5 C for 10 seconds for the state of charge (SOC) at −30° C. The results thereof are presented in FIG. 5.

Low-temperature outputs were calculated from voltage differences which were obtained by discharging the lithium secondary batteries of Examples 2 and 3 and Comparative Example 4 at 0.5 C for 10 seconds for the state of charge (SOC) at −30° C. The results thereof are presented in FIG. 6.

Figure 5:
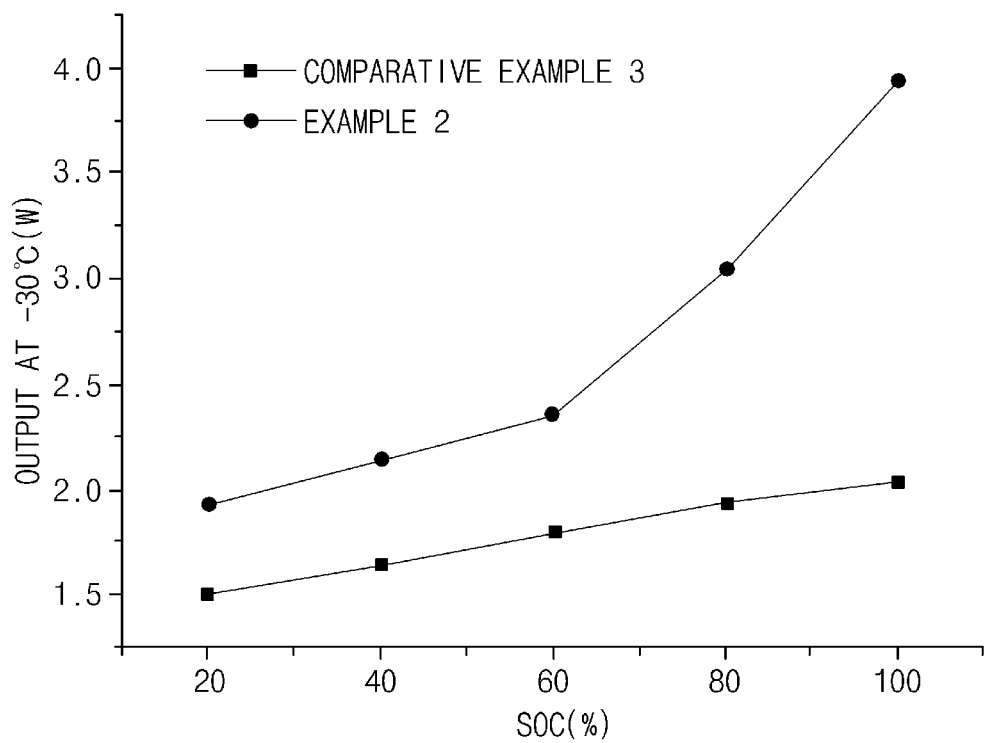
FIGS. 5 and 6 are graphs illustrating the results of the measurement of low-temperature output characteristics of lithium secondary batteries including a non-aqueous electrolyte of the present invention, according to Experimental Example 5.

Referring to FIG. 5, in a case where the SOC was 100%, it may be understood that the lithium secondary battery of Example 2 had low-temperature output characteristics that were improved a maximum of about 2 times in comparison to that of the lithium secondary battery of Comparative Example 3. Similarly, in a case where the SOC was 20%, 40%, 60%, and 80%, it may be understood that the low-temperature output characteristics of Example 2 were consistently better than those of Comparative Example 3 over the entire SOC range.

That is, it may be confirmed that the electrolyte solution additive including 1 wt % of lithium difluorophosphate had a greater effect of improving the low-temperature output characteristics of the lithium secondary battery than the electrolyte solution additive including 1.2 wt % of lithium difluorophosphate.

Figure 6:
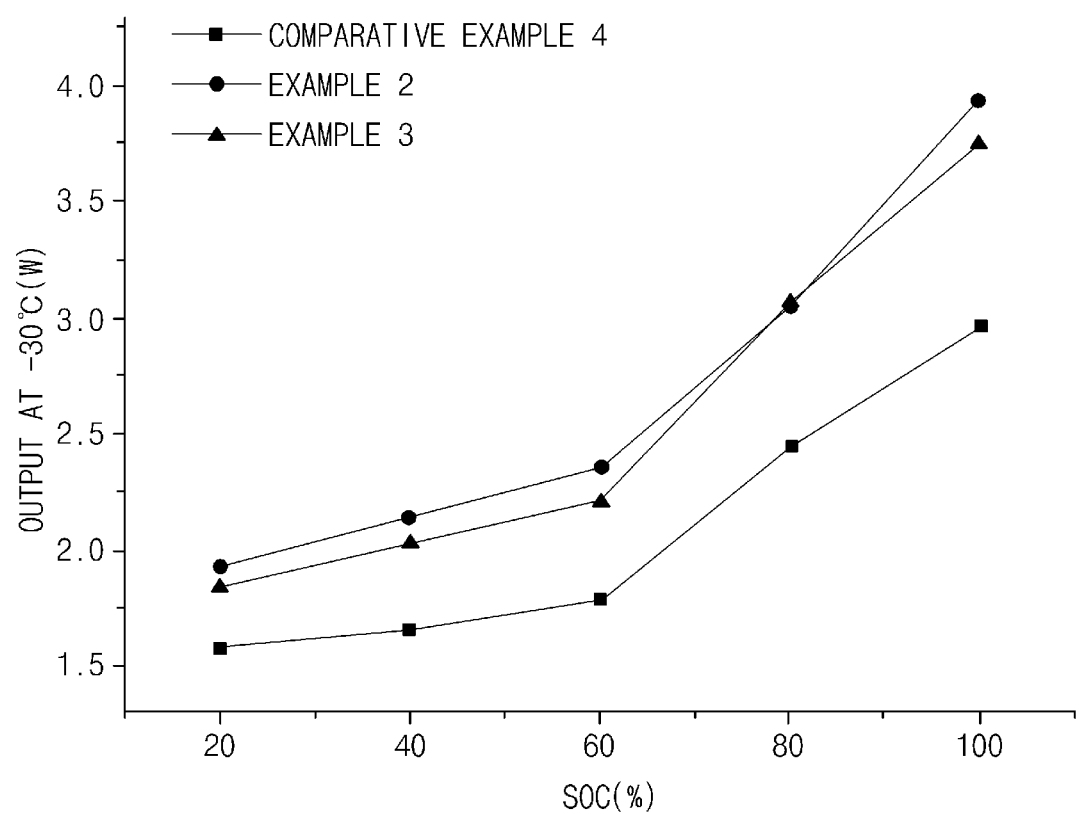

Referring to FIG. 6, in a case where the SOC was 100%, it may be understood that the lithium secondary batteries of Examples 2 and 3 having a ratio of VC to PS of 6:1 or 5.8:1 had low-temperature output characteristics that were improved about 1.2 times in comparison to that of the lithium secondary battery of Comparative Example 4 having a ratio of VC to PS of 6.2:1. Similarly, in a case where the SOC was 20%, 40%, 60%, and 80%, it may be understood that the low-temperature output characteristics of Examples 2 and 3 were consistently better than those of Comparative Example 4 over the entire SOC range.

Experimental Example 6

High-Temperature Cycle Characteristics Test of Lithium Secondary Battery

The lithium secondary batteries of Example 2 and Comparative Example 3 were charged at 1 C to 4.2 V/38 mA at 55° C. under a constant current/constant voltage (CC/CV) condition and then discharged at a constant current (CC) of 3 C to a voltage of 3.03 V to measure discharge capacities. The charge and discharge were repeated 1 to 800 cycles and the measured discharge capacities are presented in FIG. 7.

The lithium secondary batteries of Examples 2 and 3 and Comparative Example 4 were charged at 1 C to 4.2 V/38 mA at 55° C. under a constant CC/CV condition and then discharged at a CC of 3 C to a voltage of 3.03 V to measure discharge capacities. The charge and discharge were repeated 1 to 800 cycles and the measured discharge capacities are presented in FIG. 8.

Figure 7:
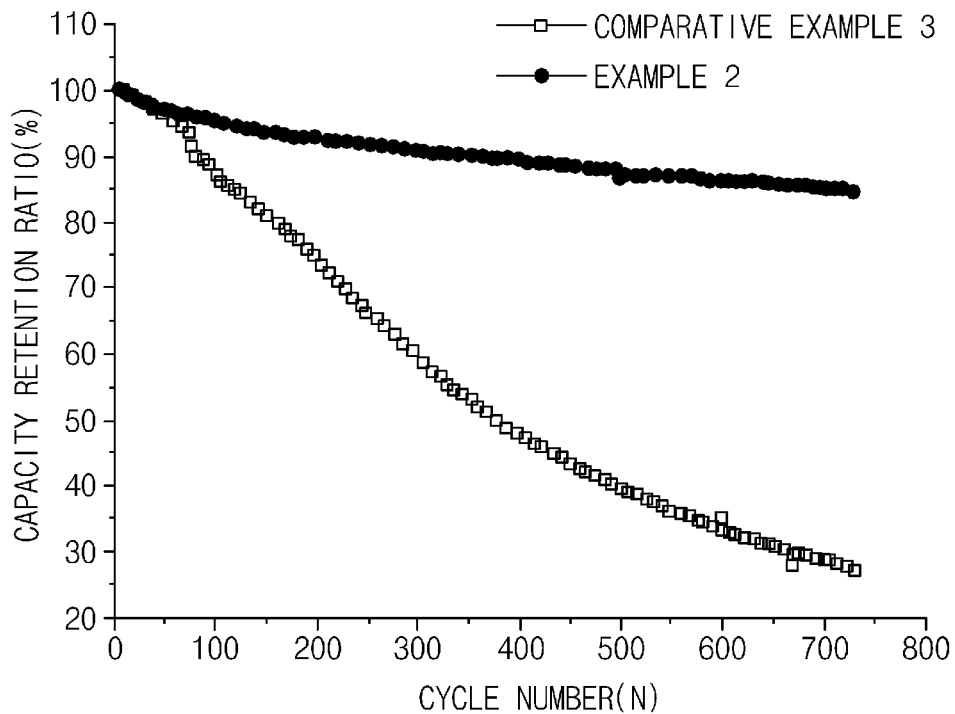
FIGS. 7 and 8 are graphs illustrating the results of the measurement of high-temperature (55° C.) cycle characteristics of lithium secondary batteries including a non-aqueous electrolyte of the present invention, according to Experimental Example 6.

Referring to FIG. 7, with respect to high-temperature cycle characteristics, it may be understood that the lithium secondary battery of Example 2 initially exhibited a capacity retention ratio similar to that of Comparative Example 3 to a $70^{th}$ cycle, but the capacity retention ratio of the lithium secondary battery of Comparative Example 3 was rapidly decreased after about a $100^{th}$ cycle. It may be understood that Comparative Example 3 exhibited a significant difference in the capacity retention ratio in a $700^{th}$ cycle from Example 2, and the capacity retention ratio of Example 2 may be constantly maintained to the $700^{th}$ cycle.

Thus, it may be confirmed that the capacity retention ratio in the case of including 1 wt % of lithium difluorophosphate was better than that in the case of including 1.2 wt % of lithium difluorophosphate.

Figure 8:
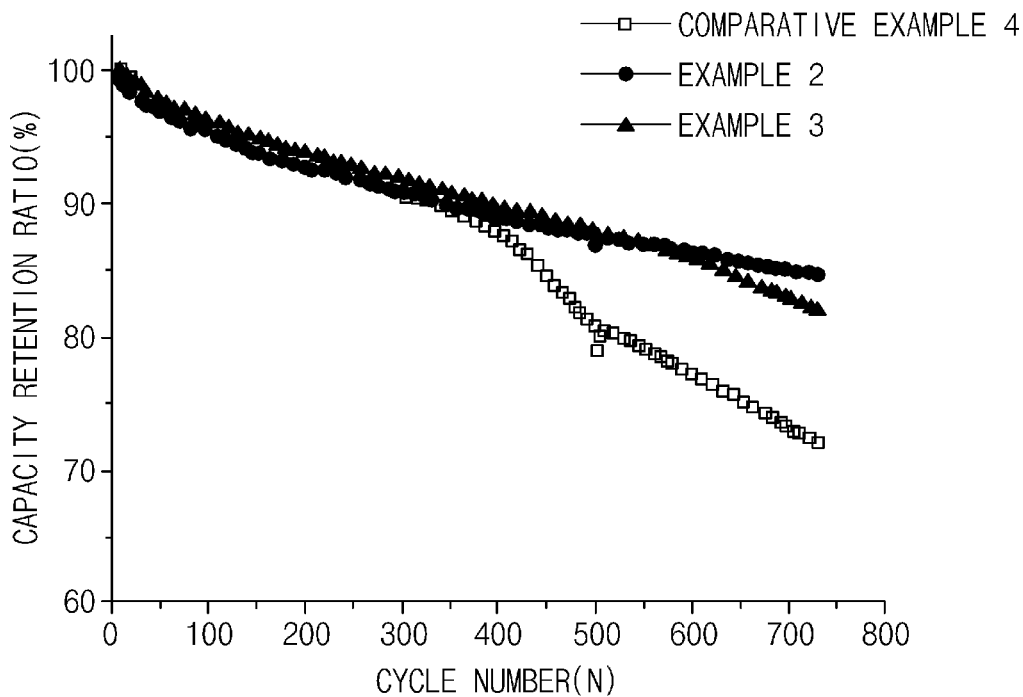

Referring to FIG. 8, with respect to high-temperature cycle characteristics, it may be understood that the lithium secondary batteries of Examples 2 and 3 exhibited capacity retention ratios similar to that of Comparative Example 4 to a $350^{th}$ cycle, but the capacity retention ratio of the lithium secondary battery of Comparative Example 4 was rapidly decreased after about a $400^{th}$ cycle. It may be understood that Comparative Example 4 exhibited a significant difference in the capacity retention ratio in a $700^{th}$ cycle from Examples 2 and 3, and the capacity retention ratios of Examples 2 and 3 may be constantly maintained to the $700^{th}$ cycle.

Thus, it may be confirmed that the capacity retention ratios of Examples 2 and 3, in which a ratio of VS to PS was 6:1 to 5.8:1, were better than that of Comparative Example 4 in which the ratio of VS to PS was 6.2:1.

Experimental Example 7

Output Characteristics After High-Temperature Storage of Lithium Secondary Battery The lithium secondary batteries of Example 2 and Comparative Example 3 were stored at 60° C. for 12 weeks. Then, the lithium secondary batteries were charged at 1 C to 4.2 V/38 mA under a constant current/constant voltage (CC/CV) condition and then discharged at a constant current (CC) of 1 C to a voltage of 3.0 V to measure discharge capacities. The results thereof are presented in FIG. 9.

The lithium secondary batteries of Examples 2 and 3 and Comparative Example 4 were stored at 60° C. for 12 weeks. Then, the lithium secondary batteries were charged at 1 C to 4.2 V/38 mA under a constant CC/CV condition and then discharged at a CC of 1 C to a voltage of 3.0 V to measure discharge capacities. The results thereof are presented in FIG. 10.

Figure 9:
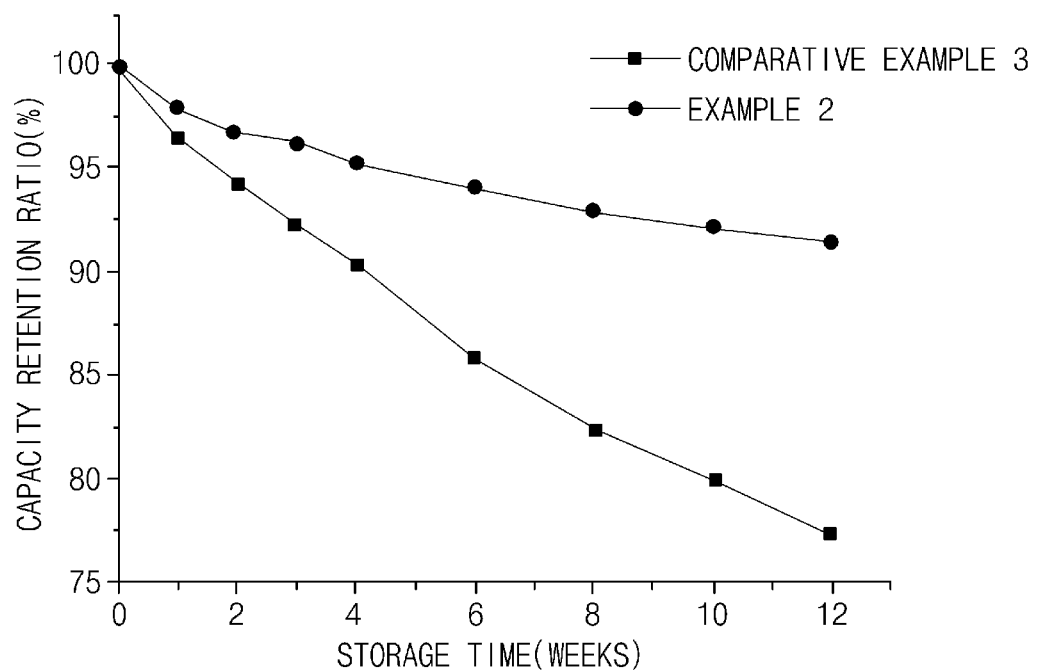
FIGS. 9 and 10 are graphs illustrating the results of the measurement of output characteristics after high-temperature storage of lithium secondary batteries including a non-aqueous electrolyte of the present invention, according to Experimental Example 7.

Referring to FIG. 9, it may be identified that the difference between capacity characteristics of Example 2 and Comparative Example 3 was increased as the storage time increased from 1 week. In particular, it may be confirmed that the capacity retention ratio of Example 3 was significantly decreased.

Figure 10:
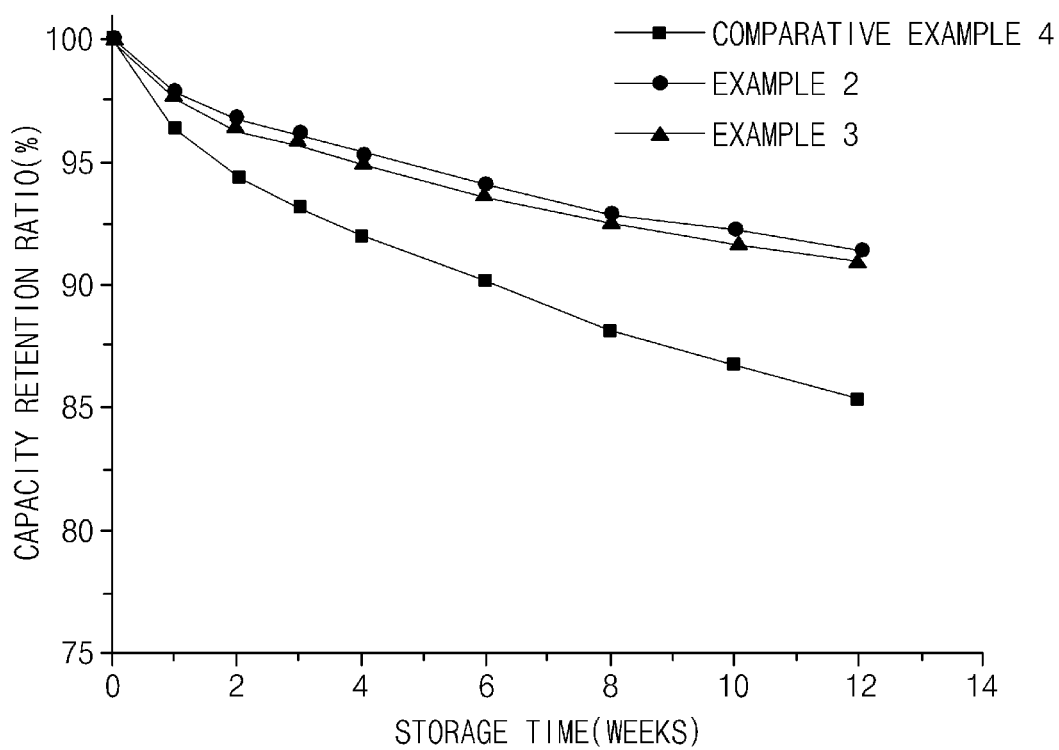

Referring to FIG. 10, it may be understood that there was a little difference between capacity characteristics of Examples 2 and 3 and Comparative Example 4 to a storage time of 1 week, the capacity characteristics of Comparative Example 4 were gradually decreased as the storage time increased after a storage time of 2 weeks, and the difference between the capacity characteristics of Comparative Example 4 and Examples 2 and 3 were gradually increased after a storage time of 3 weeks. Also, it may be confirmed that high-temperature capacity characteristics of Examples 2 and 3 were consistently maintained for 12 weeks.

Therefore, it may be confirmed that the output characteristics after high-temperature storage of the lithium secondary batteries of Examples 2 and 3 were improved in comparison to that of the lithium secondary battery of Comparative Example 4.

The invention claimed is:

1. A non-aqueous electrolyte solution comprising:
    an electrolyte solution additive including lithium difluorophosphate (LiDFP); a vinylene carbonate-based compound; and a sultone-based compound;
    a non-aqueous organic solvent; and
    a lithium salt,
    wherein the amount of the lithium difluorophosphate is in a range of 0.05 wt % to 1 wt % based on the total weight of the electrolyte solution,
    wherein a weight ratio of lithium difluorophosphate to the vinylene carbonate-based compound is in a range of 1:2.9 to 1:15, and
    wherein a weight ratio of the vinylene carbonate-based compound to the sultone-based compound is in a range of 1:1 to 6:1; and
    wherein the total amount of the electrolyte solution additive is 1 wt % to 10 wt % based on the total weight of the electrolyte solution.

2. The non-aqueous electrolyte solution of claim 1, wherein the vinylene carbonate-based compound comprises vinylene carbonate, vinylene ethylene carbonate, or a combination thereof.

3. The non-aqueous electrolyte solution of claim 1, wherein an amount of the vinylene carbonate-based compound is in a range of 0.1 wt % to 5 wt % based on the total weight of the electrolyte solution.

4. The non-aqueous electrolyte solution of claim 1, wherein the sultone-based compound is any one selected from the group consisting of 1,3-propane sultone, 1,4-butane sultone, and 1,3-propene sultone, or a mixture of two or more thereof.

5. The non-aqueous electrolyte solution of claim 1, wherein an amount of the sultone-based compound is in a range of 0.01 wt % to 5 wt % based on the total weight of the electrolyte solution.

6. The non-aqueous electrolyte solution of claim 1, wherein the lithium salt comprises any one selected from the group consisting of $LiPF_6$, $LiAsF_6$, $LiCF_3SO_3$, $LiN(CF_3SO_2)_2$, $LiBF_4$, $LiBF_6$, $LiSbF_6$, $LiN(C_2F_5SO_2)2$, $LiAlO_4$, $LiAlCl_4$, $LiSO_3CF_3$ and $LiClO_4$, or a mixture of two or more thereof.

7. The non-aqueous electrolyte solution of claim 1, wherein the non-aqueous organic solvent comprises linear carbonate, cyclic carbonate, ester, ether, ketone, or a combination thereof.

8. The non-aqueous electrolyte solution of claim 7, wherein the cyclic carbonate is any one selected from the group consisting of ethylene carbonate (EC), propylene carbonate (PC), and butylene carbonate (BC), or a mixture of two or more thereof, and the linear carbonate is any one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

9. A lithium secondary battery comprising:
    a cathode;
    an anode; and
    the non-aqueous electrolyte solution of claim 1.

* * * * *